Nov. 6, 1934.                    W. TODD                    1,979,849
FOUR-WHEEL BRAKE MECHANISM
Filed July 17, 1933
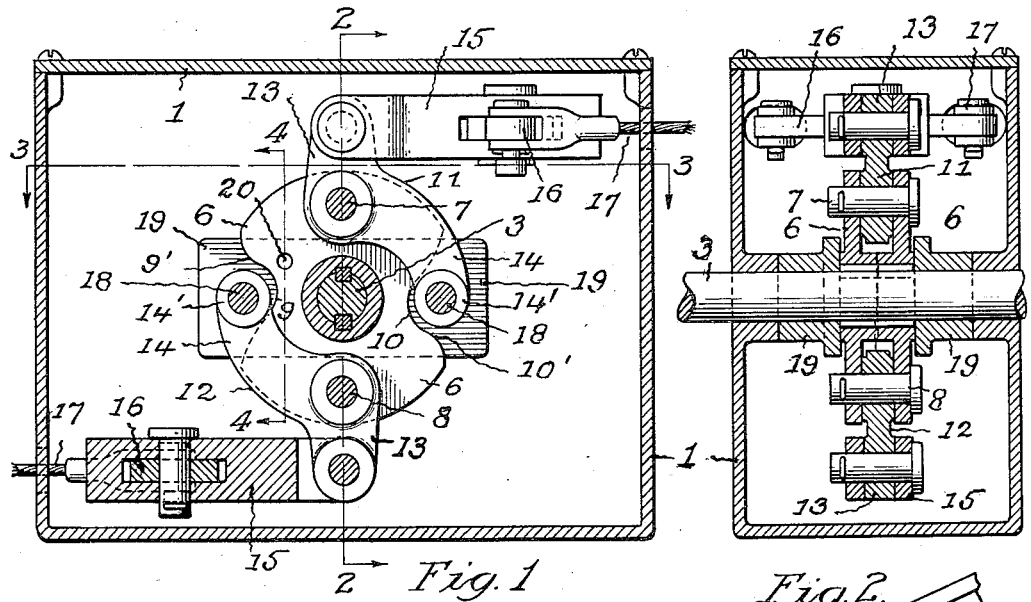
Fig. 1
Fig. 2
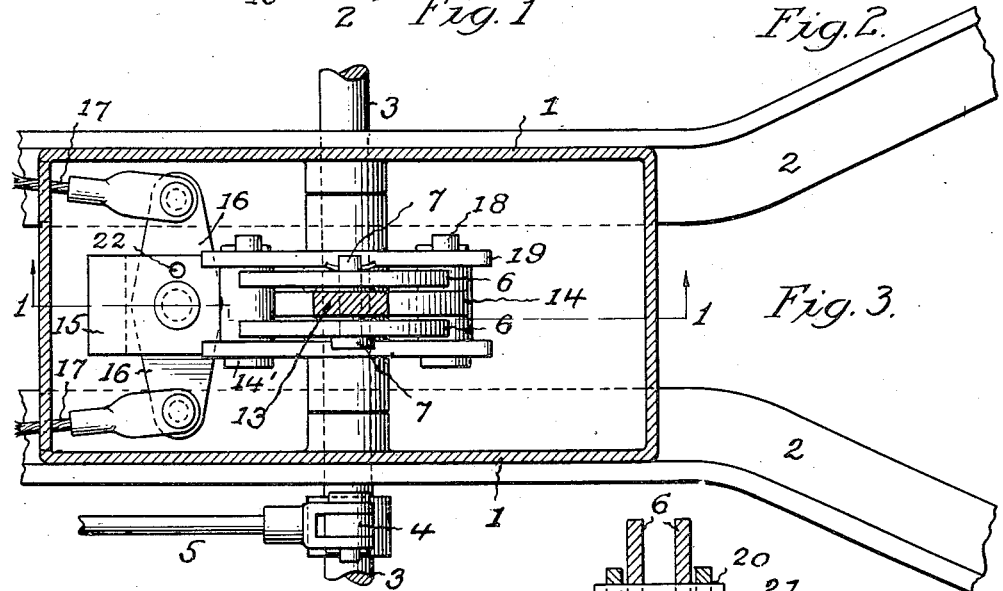
Fig. 3
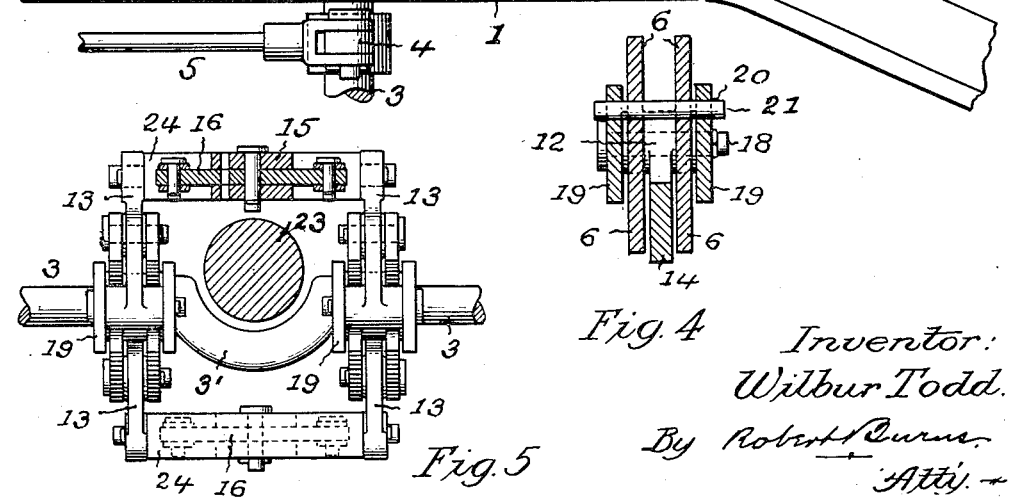
Fig. 5
Fig. 4
Inventor:
Wilbur Todd.
By Robert Burns
Atty.

Patented Nov. 6, 1934

1,979,849

UNITED STATES PATENT OFFICE 1,979,849

FOUR-WHEEL BRAKE MECHANISM

Wilbur Todd, Chicago, Ill.

Application July 17, 1933, Serial No. 680,812

6 Claims. (Cl. 188—204)

The invention relates to that type of four wheel brakes for motor driven vehicles in which the braking stress of the pair of front wheel brakes and the pair of rear wheel brakes are automatically equalized in the varying conditions to which the braking system is exposed during continued actual use. An example of which constitutes the subject matter of my prior application for patent, Serial No. 659,521, filed March 3, 1933. And this improvement has for its objects:—

To provide a structural formation and combination of parts in a strain equalizing unit for four wheel brake systems, embodying the features of simplicity, durability and effectiveness of operation of the system.

To provide a simple effective formation and association of the equalizing unit whereby a temporary locking of the parts against independent movement during a timing adjustment of the brake mechanisms to provide proper operative relation of the members thereof.

To provide a formation and arrangement of the parts of the equalizing unit, whereby undue movement of the equalizer members thereof is prevented, so that the pairs of forward and rearward brake mechanisms may successfully operate upon a breakdown of said equalizer members.

To provide a structural formation and arrangement of parts wherein an interconnected pair of equalizing units are arranged in spaced relation, so as to span the drive shaft of an automobile where it is desirable to locate the equalizing means in close proximity to said shaft, all as will hereinafter more fully appear.

In the accompanying drawing:

Fig. 1 is a longitudinal section on line 1—1 Fig. 3, of the preferred form of the equalizing unit.

Fig. 2 is a transverse section of the same on line 2—2 Fig. 1.

Fig. 3 is a horizontal section of the same on line 3—3 Fig. 1, showing the same attached to the diagonal braces of a motor vehicle.

Fig. 4 is a detail section on line 4—4 Fig. 1, illustrating the arrangement of the temporary locking means of this improvement.

Fig. 5 is a transverse section illustrating the duplex and interconnected equalizing units in their arrangement in relation in close proximity to the drive shaft of a motor vehicle.

Like reference numerals indicate like parts in the different views.

In the preferred arrangement of this invention as shown in Fig. 3 of the drawing, the supporting frame or housing 1 of the strain equalizing unit of a four wheel brake hook-up, has the usual location midway between the front pair and the rear pair of wheel brakes of a motor vehicle and preferably attached to the diagonal brace members 2 of the chassis of said vehicle, with said equalizing unit comprising a fixed supporting frame or housing 1, the side walls of which are formed with aligned bearings for the transverse operating rock shaft 3 of the unit, said rock shaft 3 being provided with an operating arm 4 the free end of which is operatively connected by a pull rod 5 with a manually actuated operating appliance of any ordinary type, usually a foot lever, located in operative proximity to the foot of the operator of the vehicle.

A rocking member, preferably in the form of a pair of counterpart disks 6, fixedly mounted in separated relation on the aforesaid rock shaft 3, and connected together adjacent to their perimeters by a pair of crank pins 7 and 8, positioned in diametrically opposed relation to the axis of rotation of the rocking member. Said crank pins are located adjacent to the perimeters of the disks 6 aforesaid, and said disks in approximately right angle relation to said crank pins are formed with peripheral recesses 9 and 10, adapted to provide for limited independent movement of the free ends of the hereinafter described pair of bell crank members 11 and 12, and with such movement limited by radially arranged end walls 9' and 10' of the recesses 9, 10, as shown.

The pair of bell crank members 11 and 12, above referred to, are pivotally mounted on the crank pins 7 and 8 and have diametrically opposed location with relation to the axis upon which the rocking members 6 and rock shaft 3 aforesaid have rocking movement.

One arm 13 of each of said bell crank members is extended outwardly beyond the perimeter of said rocking member, and has at its free end pivotal connection to an individual clevis head 15 carrying the usual equalizer lever 16, the respective ends of which have pull connections 17, in the one case with the pair of front wheel brakes of a vehicle, and in the other case with the pair of rear wheel brakes of said vehicle, as usual in the present type of four wheel vehicle brakes.

The other arms 14 of the bell crank members 11, 12, are positioned in oblique relation to their companion arms 13, with their outer ends in horizontally spaced relation to the central rock shaft 3 of the appliance. The arms 14 are preferably of the curved form shown with a view to afford a compact arrangement of parts.

At their free ends the aforesaid arms 14 are formed with transverse pivot orifices for reception of the transverse pivot pins 18 by which pivotal connection is had with the respective ends of connecting links 19 arranged at the respective sides of aforesaid rocking member of the appliance, and adapted to have limited rocking movement on the rock shaft 3 aforesaid. With the described arrangement the connecting link 19 is adapted to function as an equalizer member and impart equalizing movements in opposite directions to the bell crank members 11 and 12 and the brake connections and mechanism associated therewith.

In the construction shown, the free ends of the aforesaid arms 14 of the bell crank members 11, 12, are provided with laterally extending hubs 14' adapted for limited independent play in the peripheral recesses 9, 10, of the disks 6 with such play limited by the end walls 9' and 10' of said recesses. It is, however, within the scope of this part of the invention to dispense with the aforesaid lateral hub formations and have the pivot pins 18 function in their stead in the recesses 9 and 10. With either arrangement and with a partial disablement of the equalizing unit, the hubs 14' or the pivot pins 18 are adapted to come to a fixed stop in the recesses 9 and 10, so that the braking system as a whole may function in the ordinary manner, but with an absence of the equalizing function between the front and rear pairs of brake mechanism, which this improvement normally affords. The useful functions resulting from the above described construction are that with the movement limiting features, should an individual pull cable, etc., become disabled, there would still exist an effective braking action for one pair of opposed wheels, either the two front wheels or the two rear wheels, depending on which pull cable, etc., was defective. Accordingly, if any pull cable or like part should become broken or disabled, as the driver was applying the braking mechanism on a slippery or other pavement, the car would be brought to a stop squarely, in that the brakes of the two front wheels or the brakes of the two rear wheels, as the case may be, would be operative.

Another feature of this improvement involves the provision in the rocking member and the connecting link 19 aforesaid, of aligned orifices 20 adapted to receive a traverse locking pin 21 whereby the said parts are locked in fixed relation during the proper relative adjustment of the parts of the brake system as a whole and as shown in Fig. 4. And with a view to a more effective attainment of said relative adjustment, the clevis heads 15 and equalizing lever 16 of the front and rear wheel brakes of the system will be provided with similar orifices 22 for the reception of locking pins. The described means affords a convenient means for effecting a rapid relative adjustment of the various members of the system.

Another feature of this improvement involves the formation of the operating rock shaft 3 with an offset portion 3' adapted to provide clearance between an equalizer unit of the present type and the drive shaft 23 of a motor driven vehicle, in cases where a close association of said unit and drive shaft is desired. In attaining said relative arrangement of the parts just described, it has been found to be preferable to duplicate the present equalizing unit, comprising the rocking member 6 and bell crank levers 11, 12, heretofore described, at the respective sides of the offset 3' of the driving shaft 3 and fixedly connecting the arms 13 of the bell crank members 11 and 12 together by transverse extensions 24 of the clevis members or heads 16, so that said bell crank levers will be caused to move in unison.

Having thus fully described my invention, what I claim as new, is:—

1. The combination with the pairs of front and rear wheel brake mechanisms of a vehicle, an equalizing unit located intermediate of said pairs of brake mechanisms midway thereof, said unit comprising an operating rock shaft having operative connections under control of the driver of the vehicle, a rocking member of a disk form fixed on said rock shaft and formed with diametrically opposed recesses in its perimeter, a pair of diametrically opposed bell crank members pivotally mounted on said rocking member in right angle relation to said recesses, one arm of each bell crank member extending outwardly and operatively connected to the individual braking means of one pair of vehicle wheels, the other arm of each bell crank member being positioned in oblique relation to the aforesaid outwardly extending arms with their outer ends in spaced horizontal relation to the said central rock shaft and having limited movement to and from each other in the peripheral recesses of the rocking member, and an equalizing link pivotally connected to the free ends of the oblique arms of the said bell crank members.

2. A brake mechanism as specified in claim 1, and wherein the rocking member is composed of a pair of disks fixed in separated relation on the operating rock shaft and formed with diametrically opposed recesses in their perimeters.

3. A brake mechanism as specified in claim 1, and wherein the free ends of the oblique arms of the bell crank members carry lateral members adapted to move in the recesses of the rocking member and limit the play of the bell crank members and the equalizing link.

4. A brake mechanism as specified in claim 1, and wherein the free ends of the oblique arms of the bell crank members carry lateral members in the form of side hubs adapted to move in the recesses of the rocking members and limit the play of the bell crank members and the equalizing link.

5. A brake mechanism as specified in claim 1, and wherein the rocking member and a bell crank member are formed with orifices adapted to register and receive a locking pin to lock said members together during an assembly adjustment of the brake mechanisms of the system.

6. A brake mechanism as specified in claim 1, and wherein the rock shaft of the equalizing unit is formed with an offset adapted to clear the driving shaft of the vehicle, with the equalizing units arranged at the respective sides of said offset and are fixedly connected together to operate in unison.

WILBUR TODD.